Sept. 16, 1947.  R. R. BUTTS  2,427,441

VALVE

Filed Sept. 10, 1945

INVENTOR.
Richard R. Butts
BY
*Murray, Sackhoff & Paddock*
ATT'YS

Patented Sept. 16, 1947

2,427,441

UNITED STATES PATENT OFFICE 2,427,441

VALVE

Richard R. Butts, Miamisburg, Ohio

Application September 10, 1945, Serial No. 615,371

11 Claims. (Cl. 251—136)

The present invention relates to valves, particularly to self-closing valves such as flush valves and has for an object the provision of a valve of this character which is simple and effective and which comprises but few parts.

A further object of the invention is to provide a valve of the kind indicated which requires no packing of the valve operating stem, but which is completely sealed throughout by the mounting of the valve cap or bonnet over an easily inserted diaphragm valve element in the casing.

A still further object of the invention is to provide a unitary diaphragm valve element that forms an equalizing pressure chamber within the valve casing body.

These and other important objects are attained by the means described herein and exemplified in the accompanying drawings, in which.

Figure 1:
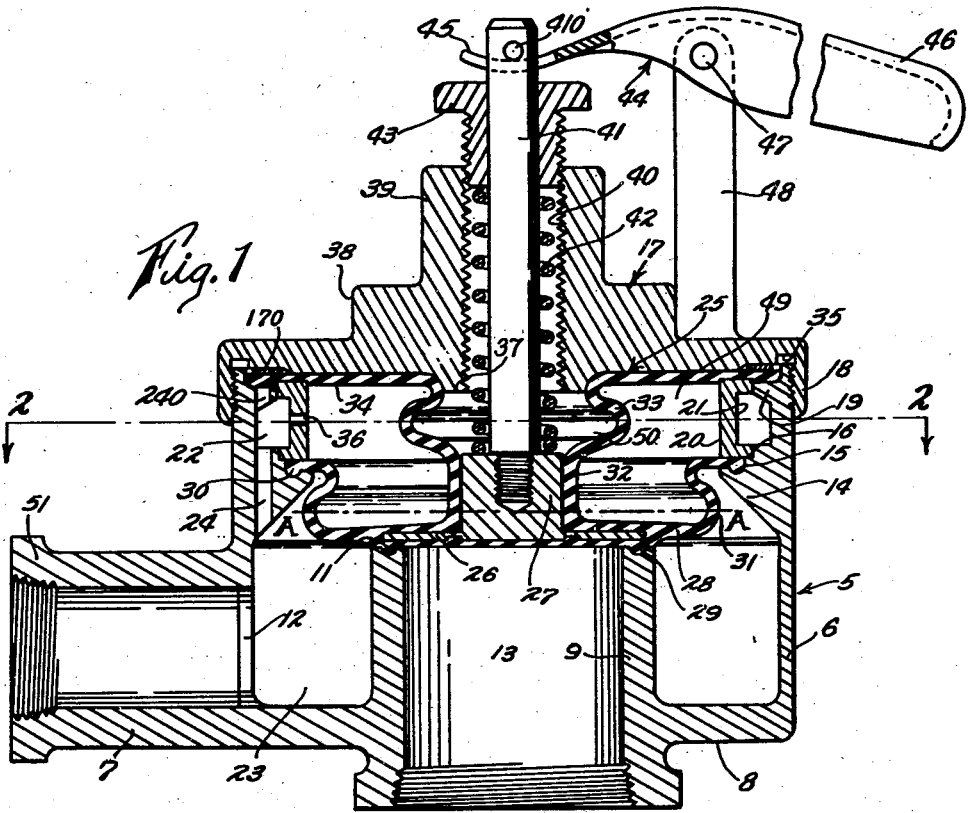
Fig. 1 is a vertical cross-sectional view through the center of the inlet port of a valve embodying the invention.

The valve of the present invention as herein exemplified is a flush valve of the type that is manually or otherwise tripped momentarily for subsequent automatic unseating of the valve during an interval providing for the discharge of a predetermined quantity of pressure liquid followed by automatic closing. It is a special object to provide a plumbing fixture of this kind that is devoid of packing glands and packing as well as washers. The valve of the invention is readily adjustable to deliver an adjusted quantity of water from a predetermined constant pressure source at each operation.

Reference is now made to the drawings in which 5 designates a generally cylindrical valve casing having a cylindrical side wall 6 with an extended tubular inlet passage member 7 connecting therewith above the flat annular bottom wall 8 of the casing. A tubular outlet passage member 9, here shown integral with bottom wall 8, extends from the outside of the casing 5 upwardly and concentrically into the interior of the casing to provide on its interior end an annularly grooved flat valve seat 11 which is disposed in a plane above the top of inlet port 12. The inlet port 12 is smaller in diameter than the outlet passage 13 as defined by member 9 and valve seat 11.

On the inside of cylindrical wall 6 of casing 5 is an annular flange 14, the sloping bottom face of which terminates in a plane with the valve seat 11. The upper face of flange 14 has a counterbore including an annular groove at 15 and a salient shoulder at 16 all concentric with the circular casing wall 6 and with the internal valve seat 11.

At the top the circular casing wall 6 is externally threaded to receive a bonnet or cap member 17 which has a depending internally threaded flange 18.

Figure 2:
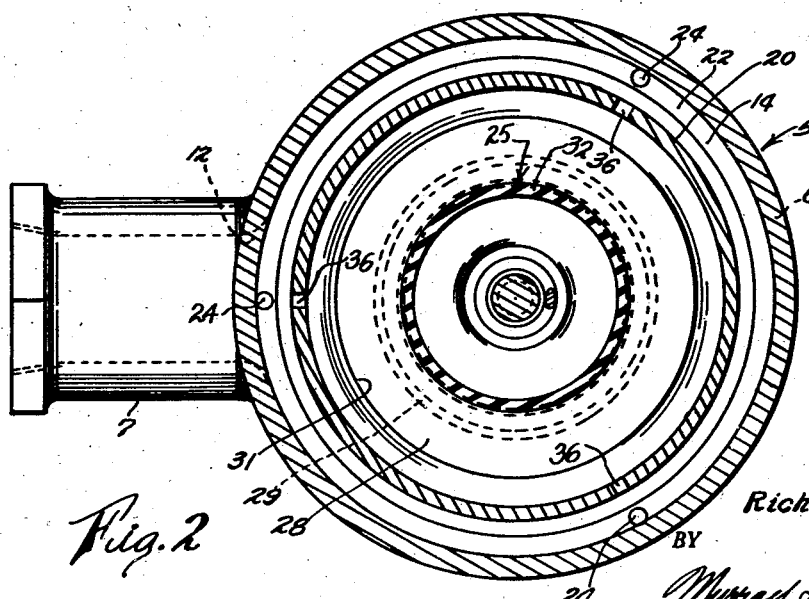
Fig. 2 is a cross-sectional view taken on line 2—2 of Fig. 1.

Spaced below the top edge of circular casing wall 6 is an inwardly projecting flange 19, the inner circumference of which is desirably of the same diameter as the larger counterbore in the top of flange 14 below it. A metal ring 20 is of a major diameter at its top and bottom, so as to slidably pass the inner circumference of flange 19 and to seat on top of shoulder 16 on flange 14. The ring 20 has an external circumferential groove 21 facing the space between flanges 14 and 19 within the casing and forming an annular passage 22 which communicates with annular flow chamber 23 surrounding the tubular outlet member 9 through one or more bleeder bores 24 (see Figs. 1 and 2).

The unitary diaphragm valve member of the invention, indicated generally by the reference character 25 is adapted to seat on flanges 19 and 14 and on valve seat 11. The diaphragm valve member is formed of molded flexible rubber or a synthetic equivalent thereof and may have tough fabric (not shown) embodied in its wall structure. Embedded in the lower portion of member 25 is a flat rigid metallic reenforcing disc 26 to which is fixed an internally threaded hub 27. The diaphragm member 28 has an embossed rib 29 for seating in the groove of the valve seat 11. The circumferential bottom extreme edge of diaphragm member 28 is developed into a thickened bead or rim 30 which conforms to the annular groove 15, while the extreme edge seats snugly against shoulder 16 above it in flange 14. A circular bellows-like section 31 is provided between rib 29 and bead 30 and in cross-section this section is of substantially S-shape.

The tubular center wall portion 32 of molded diaphragm valve member 25 tightly embraces the hub 27 and above it this tubular wall flares outwardly and then inwardly and again outwardly to form another bellows section 33 of smaller circumference than bellows section 31, but of substantially the same S-shape in cross-section. The bellows section 33 has a flat annular flange 34 of a diameter to fully cover the holes 240 in flange 19, which holes are incidental to drilling the bores 24 in flange 14.

In assembling the parts thus far described, the diaphragm member 25 is first inserted to a substantially seating position on valve seat 11 while the flexible top flange 34 thereof is bent upwardly and crumpled sufficiently to pass ring 20 down to seat over the edge of flange 28 and on top of shoulder 16 so that bead 30 is seated in groove 15, whereupon flange 34 is released and assumes a position on top of ring 20 and on the flange 19 surrounding it. Cap or bonnet 17 is now screwed down on the top of casing 5 so that the free beaded edge 30 of bellows section 31 is securely sealed to flange 14 of the casing and so that a similar pressure-tight seal is formed on flange 19 and the top of ring 20 on interposed diaphragm flange 28. The inner face of cap 17 is recessed annularly at 35 to assure additional tightening of its threaded connection in order to attain a complete seal throughout with the aid of slip washer 170, and allow for wear. The wall of ring 20 has bores 36 corresponding in number and spacing with the bores 24.

Cap 17 has an internal boss 37 with a filleted edge to which the smaller bellows section 33 conforms. On the outside of cap 17 is a polygonal section 38 for the reception of a wrench, above which is a cylindrical thimble 39. A threaded bore 40 extends entirely through the center of the cap. An operating stem 41 passes through bore 40 and is threadedly secured into hub 27 of the diaphragm valve. A coil spring 42 surrounds the stem in the bore and abuts boss 27. An adjusting plug 43 is threaded into bore 40 to regulate the pressure of the spring on the hub 27. A pin 410 in the stem serves to lift the stem and the attached rigid center portion of diaphragm valve member 28, when force is applied by any suitable operating mechanism such as is indicated generally at 44. As shown the fingers 45 of the bifurcated end of a manual trip lever 46 engage beneath the pin. The lever 46 is pivoted intermediate its ends at 47 on an upright 48 which may be integral with cap 17 for convenience.

With the parts tightly assembled, the chamber 49 surrounding the tubular center of member 25 is sealed against air and water pressures from the flow chamber 23 below said member 25 save by the connecting bore or bores 24.

When the valve is installed, for example, in a plumbing fixture, a normal atmospheric pressure exists in outlet passage 13 and in the hollow interior of the tubular stem well 50 which is surrounded by the bellows section 33 of member 25. The spring 42 exerts little or no pressure on the rigid valve section in the area defined by annular rib 29 to hold the valve on its valve seat 11. When the valve is initially installed substantially normal atmospheric pressure and no water is found in the device.

The inlet connection 51 is threadedly connected to a source of water under pressure, e. g., city water pressure at say sixty pounds per square inch. As the water pressure is opened to communication with inlet port 12, the pressure flow fills annular flow chamber 23, and, in doing so, the entrained air in flow chamber 23 is displaced upwardly through bleeder bores or passages 24, annular channel 22 and bores 36, thus placing the air in equalizing pressure chamber 49 and in the annular chamber 22 under pressure until a static equalized pressure exists with the water completely filling flow chamber 23 and at least the bottom of channel 22 below bores 36. At this time the valve is held closed by the compressed air pressure operating on the greater exposed interior surface of diaphragm 28 operating against the equal pressure in pounds per square inch exerted by the water in flow chamber 23 against the lesser exposed portion of diaphragm 28.

To operate the valve, the lever 46 is depressed, thus lifting the valve slightly from its seat slightly to crack the seal on the valve seat and initiate the flow of water through the outlet passage 13 which is of large diameter. The rush of water past the bleeder bores 24 withdraws water from said bores and annular chamber 22 assisted by the pressure increase in chamber 49 caused by the lifting action and upward displacement of diaphragm 28. The rush of water through flow chamber 23 causes further rise of member 28 which is now unopposed, but rather assisted by the suction created in bores 24. The hub 27 rising with the valve serves to place the spring 42 under compression and when the valve section has raised from seat 11 to a position for example indicated by the dashed line A—A the accumulated spring pressure suddenly overcomes the lifting pressure, causing the valve to descend to its seat and incidentally overcoming the suction from bores 24 into chamber 23 by the return of the bellows sections 31 and 33 from a collapsed position to a normal position.

The time interval during which the valve is unseated is of course inversely related to the amount of initial compression exerted by spring 42 under the adjustment of regulator plug 43. With the spring 42 compressed very slightly to exert say a few ounces of pressure, the valve diaphragm 28 will rise higher and during a somewhat longer period of time before its movement is successfully overcome by the accumulating spring pressure, hence a greater volume of water, e. g., six gallons will be discharged during the flushing operation. If the adjusted spring pressure be increased the distance traveled by the diaphragm 28 will be less at the time the loading pressure accumulated on the spring overcomes the valve opening action and the time interval will also be somewhat reduced so that a lesser volume of water will be discharged in the operation. The valve is preferably designed to provide for operation by city water pressures commonly existing and to be readily adjusted to any such commonly existing for delivering adjusted volumes of water ranging preferably from two and one-half gallons to six gallons per operation using the normally selected spring 42. The same valve structure is readily adapted to meet conditions of abnormally high or low pressures by substituting a stronger or a weaker spring whereupon adjustments as to quantity discharge per operation may be had by adjustment of the threaded plug 43.

The details of design may be modified without departure from the spirit of the invention and the scope of the appended claims.

It will be understood that the device of the invention is not necessarily limited to use in connection with plumbing fixtures but can be used to operate with any fluid which is to be discharged in selected and substantially metered quantities.

What is claimed is:

1. Automatic valve mechanism comprising a cylindrical casing, a bellows forming flexible diaphragm including a rigid center portion forming a valve, means including a valve cap forming a closure for the top of the casing and sealing the diaphragm at its periphery to the inside of the casing intermediate its top and bottom, the casing being further provided with an inlet port in its cylindrical side wall and with a tubular outlet port member of greater diameter extending through the bottom wall interiorly of the casing and terminating therein in a valve seat closed by the rigid valve portion of said diaphragm, the casing having a bleeder passage effecting restricted communication between the portions of the interior of the casing above and below the diaphragm, a loading spring operative on the top of the valve portion of the diaphragm yieldingly resisting movement of the valve from its seat and a stem member projecting through the cap for manually lifting the valve from its seat.

2. An automatic valve comprising a cylindrical casing having bleeder passages connecting its upper and lower interior, a flexible diaphragm mounted at its periphery in sealed relation to the inside of the casing and providing an upper pressure chamber and a lower flow chamber connected only by the bleeder passages, an uncontrolled inlet port member connecting with the flow chamber, an outlet port member of tubular form having its axis co-incident with the axis of the casing and terminating in a valve seat which is normally closed by said diaphragm, means to lift the diaphragm manually from its seat and a loading spring opposing the rising movement of said diaphragm.

3. A self-closing automatic valve comprising a cylindrical casing defining the exterior walls of a pressure chamber and an annular flow chamber beneath it, a tubular member forming an integral vertical outlet passage through the center of said flow chamber and terminating in a horizontal valve seat at the top of the flow chamber, a diaphragm comprising a flexible bellows portion and a rigid non-flexible center surrounded thereby, said center seating as a valve on the said horizontal seat to close the flow chamber, said casing having in its cylindrical side wall an inlet port of lesser diameter than the outlet passage and at right angles thereto, said casing further having at least one bleeder passage therein connecting said pressure chamber and said flow chamber, means to manually separate the valve from its seat and a loading spring means providing adjustable yielding resistance to movement of the valve away from its seat.

4. A flush valve structure comprising a cylindrical casing having an inlet port in its side wall and a tubular outlet passage of larger diameter and at right angles thereto extending through the bottom wall into the interior of the casing and defining a valve seat above the level of the top of the inlet port, spaced internal annular flanges on the casing wall adjacent the top and intermediate said top and said valve seat, a substantially spool-shaped flexible diaphragm including a tubular center portion with a bellows-like corrugation in the upper portion, an annular flexible flange portion seating on the upper flange in the casing and a lower flange of lesser diameter seating at its edge on the intermediate flange and provided with a non-flexible center and an annular bellows-like corrugation surrounding the non-flexible center, an externally channeled ring seating on said intermediate casing flange and the lower diaphragm flange and supporting the annular flexible flange above it at the level of the top flange in the casing, a cap member threadedly closing the casing and providing a pressure seal between the casing flanges and the respective diaphragm flanges, the lower flange having a bleeder bore therethrough effecting communication between the space between the diaphragm flanges and the space surrounding the tubular outlet, a loading spring disposed in the tubular center of the diaphragm member, a stem connected with the center of the diaphragm member and extending through the center of the spring and the cap and a threaded adjusting plug freely passing the stem and engaging on the cap for compressing the loading spring.

5. An automatic valve mechanism comprising a cylindrical casing having an annular flange intermediate its top and bottom and provided with a tubular outlet passage extending concentrically downwardly from approximately the plane of said flange through the bottom of the casing and with a pressure inlet port of lesser diameter at right angles thereto in the cylindrical side wall of said casing, a diaphragm valve member of impervious flexible material disposed across the space surrounded by said flange and including a rigid central portion, seating as a valve on the end of the tubular outlet passage, and a concentrically disposed annular bellows-like portion between said rigid valve portion and said flange, said diaphragm further including a tubular upstanding portion with an annular bellows fold in its upper part and developed at its top into an annular flexible flange, a cap having a center bore therein adapted to close the casing, an externally channeled ring having radial perforations therethrough and interposed between said top flexible flange and said diaphragm for sealing said members in position under the pressure of the cap, the annular flange in the casing having vertical bleeder bores establishing communication between the flow chamber and the annular channel in said ring, a stem extending through the cap and the tubular upstanding portion of the diaphragm and rigidly connected with the rigid portion of the latter, a loading spring abutting the last mentioned rigid portion of the diaphragm and surrounding said stem in said tubular upstanding portion, means to adjust the pressure of the loading spring and means to lift the stem axially.

6. A flush valve comprising a casing having a tubular outlet port defining at its end a valve seat intermediate the top and bottom of the casing, a spool-shaped flexible diaphragm comprising a bottom disc having a non-flexible center seating as a valve on the valve seat and having a surrounding annular flexible corrugation, an integral tubular portion including a corrugation, and a top annular flexible flange forming the top of the spool, an externally channeled rigid ring interposed between the said top flexible flange and the periphery of the bottom disc, integral flanges interiorly of the casing supporting said flexible flange and disc at the peripheries thereof and positioning said ring, a centrally open cover cap for the casing compressing the peripheries between itself and the flanges and said ring to form a sealed annular telescoping chamber above the valve seat, a loading spring seated in the open center of the tubular portion of the diaphragm, a stem passing through said spring and secured to the top of the non-flexible center of the disc, an adjusting sleeve slidably receiving the stem therethrough and threadedly adjustable in the open center of the cap for adjusting the loading pressure of the spring as the disc is raised from the valve seat and means to manually move the stem to initiate lifting of the disc from the valve seat, said ring and the lower integral flange in the valve casing having bleeder passages for relieving and equalizing pressure in the said telescoping chamber and the space surrounding the outlet tube below said disc.

7. In a valve a cylindrical casing having an open top and a tubular outlet port extending axially through the closed bottom, a flexible bellows-like diaphragm having a non-flexible rigid portion in the center for closing said outlet port and having its periphery secured in pressure-tight fixed relation to the inner circumference of the casing above the outlet port, an integral tubular portion on top of the diaphragm forming an open hollow well and flared outwardly at its top to substantially close the open top of the casing whereby an annular telescoping pressure chamber is formed in the top of the casing, a cap closing the casing and securing the top flared portion in position, a stem connected with the rigid portion of the diaphragm and extending through the well and the closing cap, a loading spring surrounding the stem within the well, and seated over said rigid portion, means passing freely over the stem and adjustably threaded into the cap for compressing the loading spring, and means to manually initiate separation of the rigid portion from its closing position over the outlet port, said casing having an uncontrolled fluid pressure inlet port in its cylindrical side wall of lesser diameter than the outlet port and at right angles thereto and a bleeder passage communicating with the interior of the casing above and below said disc.

8. A valve comprising a casing having an annular flow chamber formed in its bottom with an outlet passage in the center thereof, the inner wall of said chamber forming said passage and providing a valve seat within the casing, a closing cap for the top of the casing having an elongated central threaded opening coaxial with the outlet passage, a flexible member disposed in the casing above said outlet and comprising a bottom disc reenforced against flexing at the center and forming a closing valve seating on the valve seat, a tubular well forming member including a corrugated wall extending upwardly of said reenforced portion to the closing cap and an integral flange extending along the bottom face of the cap to the inner circumference of the casing, means including the closing cap forming a seal between the peripheral portions of said integral flange and said bottom disc respectively and the inner wall circumference of the casing, a loading spring seated in said tubular well over the reenforced portion of the disc, a stem mounted in said reenforced portion and extending upwardly through said well and said threaded opening in the cap, the casing having an uncontrolled inlet port in its side wall and an internal bleeder passage disposed at right angles to the inlet port for establishing timed pressure equalization between the flow chamber and the space between said disc and flange under varying adjustments of the loading spring.

9. A diaphragm element for forming a telescoping equalizing pressure chamber and a valve in a valve structure, said element comprising a molded flexible body having an open topped tubular well portion with annular bellows corrugations adjacent the top, an outwardly extending integral flexible flange connected with said corrugations, an integral bottom disc closing the well and having centrally embodied therein a rigid reenforcing element, said disc having an upwardly turned annular corrugation surrounding the reenforced portion and terminating in a flexible rim portion in spaced parallelism to the said annular top flange.

10. A diaphragm element for an automatic flush valve comprising a molded flexible spool-shaped body having a closed bottom end disc with a center rigidifying element embodied therein and an intermediate annular bellows corrugation terminating in an outwardly extending sealing rim, a tubular well portion extending upwardly from the center of said end disc and having annular bellows corrugation in the top thereof with an integral flange of greater circumference than said rim of the disc, and stem receiving means in the bottom of the well portion rigidly connected with said rigidifying element.

11. In a valve of the class described a telescoping pressure chamber structure comprising a cylindrical casing body having a pair of spaced internal annular flanges on its side wall, an externally channeled rigid ring element slidably passing the upper flange and seating on the lower flange whereby an annular passage is formed between said flanges, said casing side wall and said ring, the lower flange having a bleeder bore connecting said annular passage with the bottom exterior of said flange, a flexible spool-shaped diaphragm member comprising a horizontal top annular flange having its edge margin resting on the top of said ring and the encircling upper side wall flange of the casing, an integral generally tubular well portion depending from the said horizontal annular flange and provided near its juncture with a bellows corrugation, an integral bottom disc portion closing said well and having embodied therein a rigid metal circular element with a rigidly connected stem receiving element extending accessibly into the bottom of the well, said disc having an upwardly disposed bellows fold freely receiving the lower casing wall flange and resting upon it in sealed relation under the bottom of the ring, and a threaded closing cap for the casing providing sealing pressure on the top of said horizontal top flange and the ring beneath said flange for sealing the said flange and edge margin portions of the diaphragm on the casings flanges respectively and on the ring, said cap being open concentrically of the well for reception of a packless valve actuating stem into said stem receiving element.

RICHARD R. BUTTS.

REFERENCES CITED

The following references are of record in the file of this patent:

UNITED STATES PATENTS

| Number | Name | Date |
|---|---|---|
| 1,672,366 | Cadwell | June 5, 1928 |
| 2,246,136 | Krone | June 17, 1941 |
| 2,246,621 | Davis | June 24, 1941 |